(12) United States Patent
Livingston, Jr. et al.

(10) Patent No.: US 12,179,717 B2
(45) Date of Patent: Dec. 31, 2024

(54) SNOW AND ICE REMOVER FOR VEHICLE ROOFS

(71) Applicant: RITE-HITE HOLDING CORPORATION, Milwaukee, WI (US)

(72) Inventors: Howard Livingston, Jr., Lancaster, PA (US); Howard Livingston, Lancaster, PA (US); Doug Werhel, Holtwood, PA (US); Stephan Lawson, Malvern, PA (US); Eric Chang, East Brunswick, NJ (US); Thomas William Murray, Philadelphia, PA (US); Christian Kasilag, Philadelphia, PA (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 723 days.

(21) Appl. No.: 17/397,671

(22) Filed: Aug. 9, 2021

(65) Prior Publication Data
US 2021/0362691 A1    Nov. 25, 2021

Related U.S. Application Data

(63) Continuation of application No. 16/274,553, filed on Feb. 13, 2019, now Pat. No. 11,084,466.

(60) Provisional application No. 62/782,609, filed on Dec. 20, 2018, provisional application No. 62/629,768, filed on Feb. 13, 2018.

(51) Int. Cl.
*B60S 3/04*    (2006.01)

(52) U.S. Cl.
CPC ........... *B60S 3/04* (2013.01); *B60Y 2200/148* (2013.01)

(58) Field of Classification Search
CPC ................ B60S 3/04; B60S 3/06; B60S 3/00
See application file for complete search history.

(56) References Cited

U.S. PATENT DOCUMENTS

| 4,334,480 A | 6/1982 | Wallace |
| 5,802,654 A | 9/1998 | Yeaglin |
| 5,989,356 A | 11/1999 | Candeletti |
| 6,654,978 B2 | 12/2003 | Bouchard |

(Continued)

FOREIGN PATENT DOCUMENTS

| DE | 102014105495 | 10/2015 |
| WO | 2019160901 A1 | 8/2019 |

OTHER PUBLICATIONS

United States Patent and Trademark Office, "Non-Final Office Action", issued in connection with U.S. Appl. No. 16/274,553 on Oct. 19, 2020, 8 pages.

(Continued)

*Primary Examiner* — Shay Karls
(74) *Attorney, Agent, or Firm* — Hanley, Flight & Zimmerman, LLC

(57) ABSTRACT

Vehicle snow and ice removers are disclosed. An example vehicle and ice remover includes a plurality of first modular frames, where the first modular frames have a first shape and a plurality of second modular frames, where the second modular frames have a second shape different than the first shape. The first modular frames and the second modular frames are connected to form a first side frame, a second side frame opposite the first side frame, and a cross frame connecting the first side frame and the second side frame.

23 Claims, 11 Drawing Sheets

(56) References Cited

U.S. PATENT DOCUMENTS

| | | | |
|---|---|---|---|
| 7,617,561 | B2 | 11/2009 | Couture |
| 9,027,190 | B2 | 5/2015 | Quinn |
| 9,630,594 | B2 | 4/2017 | Irwin |
| 9,676,372 | B2 | 6/2017 | Roth et al. |
| 9,834,181 | B2 * | 12/2017 | Livingston ............... B60S 3/06 |
| 2009/0282708 | A1 | 11/2009 | Reed |
| 2016/0107617 | A1 | 4/2016 | Yeaglin |
| 2016/0311409 | A1 | 10/2016 | Schutz |
| 2019/0248341 | A1 | 8/2019 | Livingston, Jr. |

OTHER PUBLICATIONS

International Searching Authority, "International Search Report", issued in connection with International Patent Application No. PCT/US2019/017768 on May 13, 2019, 16 pages.

European Patent Office, "Decision to Grant a European Patent Pursuant to Article 97(1) EPC", issued in connection with European U.S. Appl. No. 19/707,980 on May 12, 2022, 2 pages.

European Patent Office, "Communication under Rule 71(3) EPC", issued in connection with European Patent Application No. 19707980.9 on Sep. 15, 2021, 7 pages.

Patent Cooperation Treaty, "International Preliminary Report on Patentability", issued in connection with International Patent Application No. PCT/US2019/017768 on Aug. 18, 2020, 10 pages.

United States Patent and Trademark Office, "Notice of Allowance and Fee(s) Due", issued in connectioin with U.S. Appl. No. 16/274,553 on Apr. 8, 2021, 5 pages.

Canadian Patent Office, "Notice of Allowance," issued in connection with Canadian Patent Appl. No. 3,033,658, dated Apr. 3, 2023, 1 page.

European Patent Office, "Partial European Search Report", issued in connection with European Application No. EP22172553, mailed on Nov. 11, 2022, 11 pages.

Patent Cooperation Treaty, "Written Opinion of the International Searching Authority," issued in connection with appl. No. PCT/US2019/059750, dated Feb. 13, 2018, 9 pages.

Patent Cooperation Treaty, "International Search Report," issued in connection with appl. No. PCT/US2019/017768, dated on Feb. 13, 2018, 6 pages.

International Searching Authority, "International Search Report," issued in connection with international application No. PCT/US2019/017768, mailed Aug. 7, 2019, 4 pages.

Patent Cooperation Treaty, "International Preliminary Report on Patentability," issued in connection with PCT No. PCT/US2019/017768, on Aug. 18, 2020, 10 pages.

European Patent Office, "Communication pursuant to Rules 161(1) and 162 EPC," issued in connection with European patent application No. 19707980.9-1015, Oct. 7, 2020, 3 pages.

European Patent Office, "European Search Report," issued in connection with European patent application No. 19707980.9-1009, Jun. 14, 2022, 2 pages.

European Patent Office, "European Search Report," issued in connection with European patent application No. 19707980.9-1009, Jan. 11, 2023, 2 pages.

Canadian Intellectual Property Office, "Certificate of Grant," issued in connection with Canadian Patent Application No. 3,033,658, dated Sep. 26, 2023, 1 page.

European Patent Office, "Communication pursuant to Article 94(3) EPC," issued in connection with European Patent Application No. 22172553.4-1009, dated Dec. 15, 2023, 8 pages.

European Patent Office, "Invitation Pursuant to Rule 63(1) EPC", issued in connection with European Patent Application No. 22 172 553.4 on Jul. 21, 2022, 4 pages.

* cited by examiner

SNOW AND ICE REMOVER FOR VEHICLE ROOFS

CROSS-REFERENCE TO RELATED APPLICATIONS

This patent arises from a continuation of U.S. patent application Ser. No. 16/274,553 which was filed on Feb. 13, 2019, titled "Snow and Ice Remover for Vehicle Roofs," which claims the benefit under 35 U.S.C. § 119 to U.S. Patent Application No. 62/629,768, filed on Feb. 13, 2018, and U.S. Patent Application No. 62/782,609, filed on Dec. 20, 2018. U.S. patent application Ser. No. 16/274,553, U.S. Patent Application No. 62/629,768, and U.S. Patent Application No. 62/782,609 are hereby incorporated herein in their entireties.

FIELD OF THE INVENTION

The present invention relates to a snow and ice remover and, more particularly, to as now and ice remover for vehicle roofs.

BACKGROUND

It is not an uncommon experience in localities which experience significant snowfall to see a slab of snow fly off the roof of a vehicle and strike a following vehicle. Regardless of the vehicle from which the snow is released, the experience is startling to the driver of the following vehicle. However, if the snow is from atop a large semi-trailer, and particularly if it has been hardened into ice, the event can not only be startling, but also very dangerous.

This has always been a concern of the trucking industry. Therefore, trucking companies spend considerable money to clear snow and ice from the roofs of trailers after every major snow storm. This effort not only takes money but also requires significant time, so that the operation of the trucks of a large fleet can be delayed significantly after a snowstorm. Furthermore, since the snow and ice removal has generally been done manually by workers shoveling from atop the trailers, employers and insurance companies are very concerned about the danger of such workers slipping and falling from the typically 13 foot high trailer roofs. Furthermore, at least one state, New Jersey, requires that such roof snow and ice be cleared before a truck moves onto a public road, but even without such requirements, there is a significant increase in fuel consumption, and therefore an increase in the cost of operation, if snow or ice is not removed.

Several devices exist that attempt to address this problem. U.S. Pat. No. 5,802,654 discloses an immovable bridge like structure supporting a vertically adjustable wedge shaped snow plow that vehicles can move under to have snow or ice removed. U.S. Pat. No. 5,989,356 by Candeletti uses a snow removal scraper supported on a pillar installed on cement footings.

One of the problems with such structures is that they are very large in both width and height, and therefore occupy significant space, particularly considering that they must have significant free space around them to permit maneuvering semi-trailers into and through them. This problem is aggravated because the height of these structures requires particular care to assure their stability, and the situation is particularly bothersome to users who do not need a snow scraper throughout a large portion of any year.

Published Patent Application US20090282708 by Reed attempts to overcome this problem by supplying a structure that is not imbedded in the ground, but instead is held down by four removable concrete blocks which rest on two base plates attached at the bottom of the vertical supports of the bridge like structure. The snow scraper structure can then be moved to a storage location when not in use. This is accomplished by using two forklifts vehicles with 5000 pound capacity. The forklifts first lift each of the 3 ton concrete blocks off the base plate. Then, by inserting their forks into pockets within the two base plates at the bottom of opposite sides of the bridge structure, the two forklifts work in tandem to move the structure. This is no easy task since the structure weighs 8,800 pounds, is over 16 feet tall, and is approximately 17 feet wide.

Since it is clear that a movable snow scraper structure has the distinct benefit of being movable out of the way when not in use, it would be very beneficial to have such a movable snow scraper available, particularly for small businesses, that does not require the use of two heavy duty forklifts and two specially skilled operators who can operate in tandem on opposite sides of a wide, tall, and heavy structure such as the typical snow scraper. Further, each of the available snow removal structures is assembled from a small number of very large and heavy pieces. It is therefore cost-prohibitive to ship any of these structures, even in a disassembled state, and assembly of these structures is complex and time-consuming, requiring large-scale equipment.

SUMMARY

A vehicle snow and ice remover comprises a plurality of modular pieces assembled together to form a pair of vertical supports and a cross piece connecting the pair of vertical supports and a roof clearing device movable along the pair of vertical supports. The plurality of modular pieces include at most two different shapes and each having a maximum outer dimension that is less than or equal to 75% of a height of each of the vertical supports.

BRIEF DESCRIPTION OF THE DRAWINGS

The invention will now be described by way of example with reference to the accompanying figures, of which.

Figure 1:
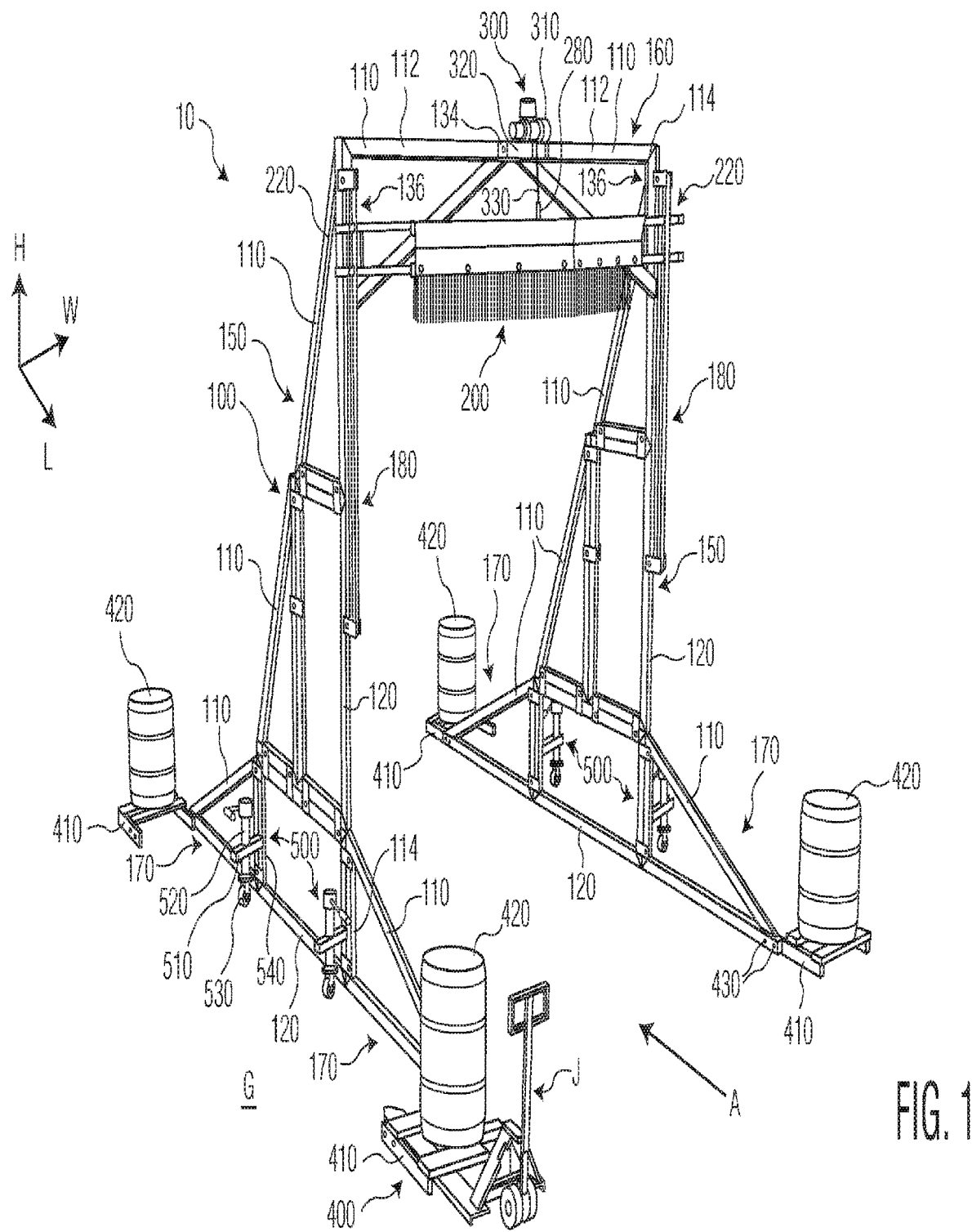
FIG. 1 is a perspective view of a snow and ice remover according to an embodiment.

DETAILED DESCRIPTION OF THE
EMBODIMENT(S)

Embodiments of the present invention will be described hereinafter in detail with reference to the attached drawings, wherein like reference numerals refer to the like elements. The present invention may, however, be embodied in many different forms and should not be construed as being limited to the embodiments set forth herein; rather, these embodiments are provided so that the disclosure will convey the concept of the invention to those skilled in the art.

A snow and ice remover 10 according to an embodiment is shown in FIGS. I and 2. The snow and ice remover 10 includes a frame 100, a plow assembly 200 supported by and moveable along the frame by a lifting device 300, a ballast 400 attached to the frame 100, and a plurality of wheel assemblies 500 attached to the frame 100.

Figure 2:
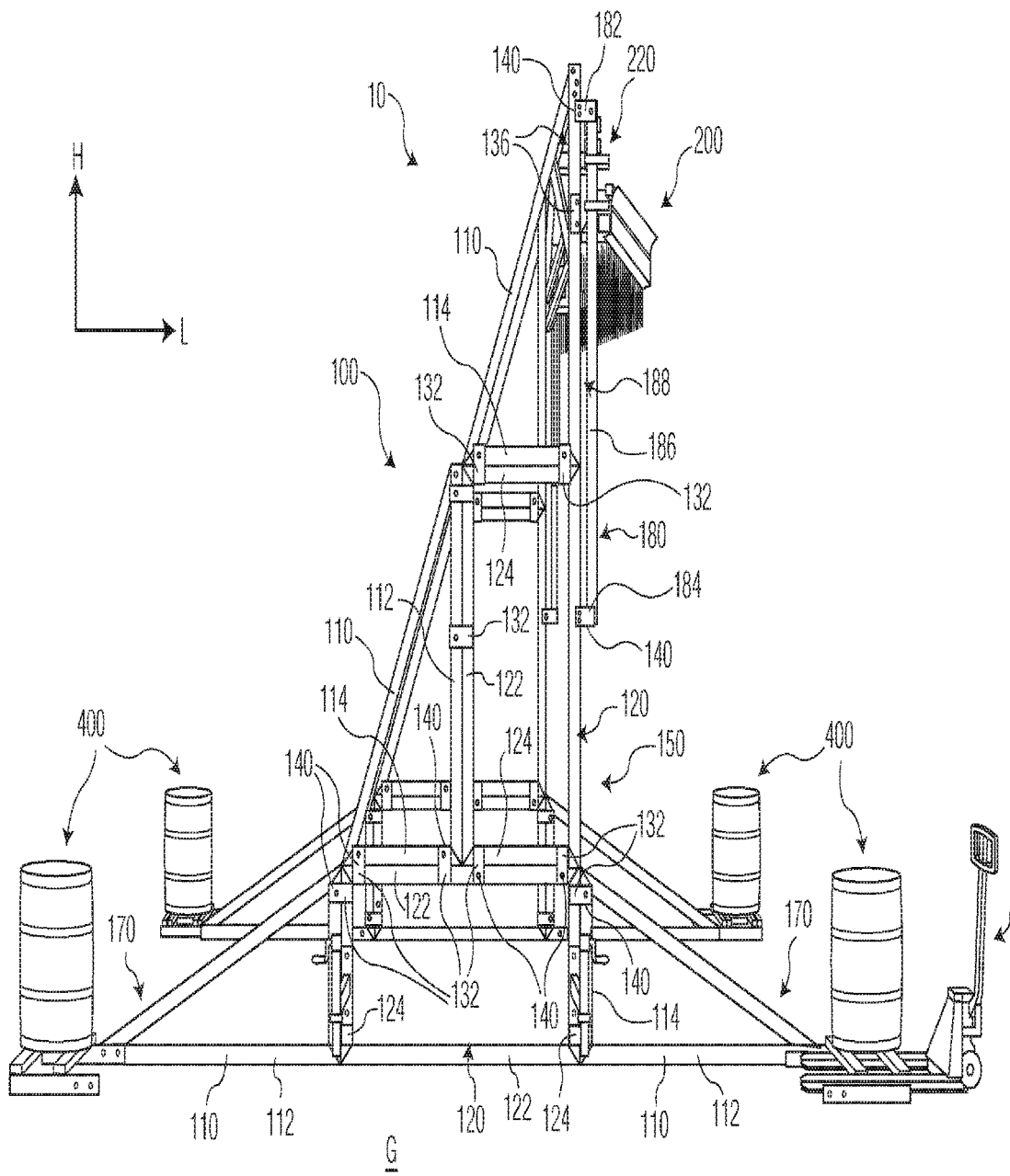
FIG. 2 is a side view of the snow and ice remover of FIG. 1.
Figure 3:
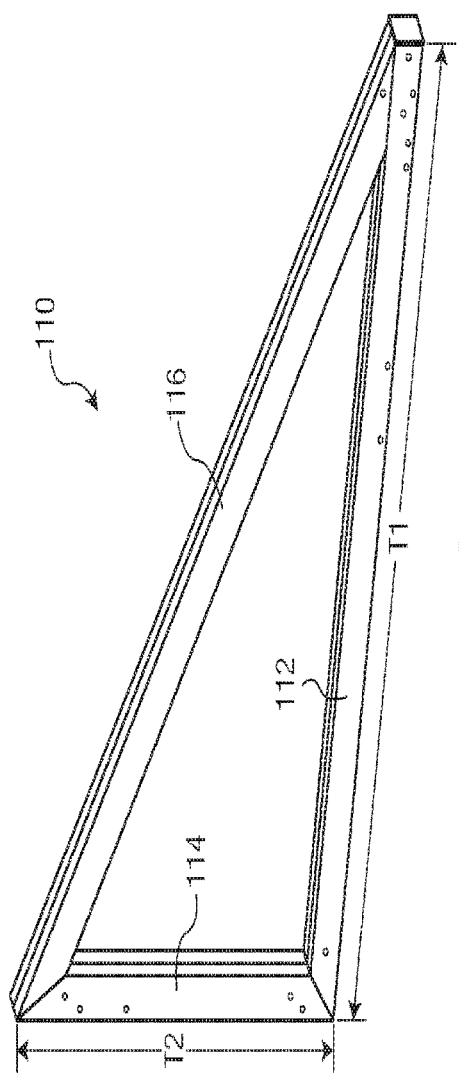
FIG. 3 is a perspective view of a first modular piece of the snow and ice remover of FIG. 1.

The frame 100, as shown in FIGS. 1-3, includes a plurality of first modular pieces 110 and a plurality of second modular pieces 120 attached together by a plurality of connectors 130 and a plurality of fasteners 140.

One of the plurality of first modular pieces 110 is shown in FIG. 3. The first modular piece 110 has a triangular shape with a first base 112, a second base 114 shorter than the first base 112, and a hypotenuse 116. The first base 112 has a length T1 and the second base 114 has a length T2. In an embodiment, the length T2 is approximately half the length of T1; in a further embodiment, the length T1 is approximately 83" and the length T2 is approximately 42". In the shown embodiment, the first base 112, the second base 114, and the hypotenuse 116 are each formed of a steel tubing and are welded together to form the first modular piece 110. In an alternative embodiment, the first base 112, second base 114, and hypotenuse 116 may be formed of a different material, such as plastic, and/or may be attached together to form the first modular piece 110 by any type of fastener known to those with ordinary skill in the art, such as a screw or a bolt.

Figure 4:
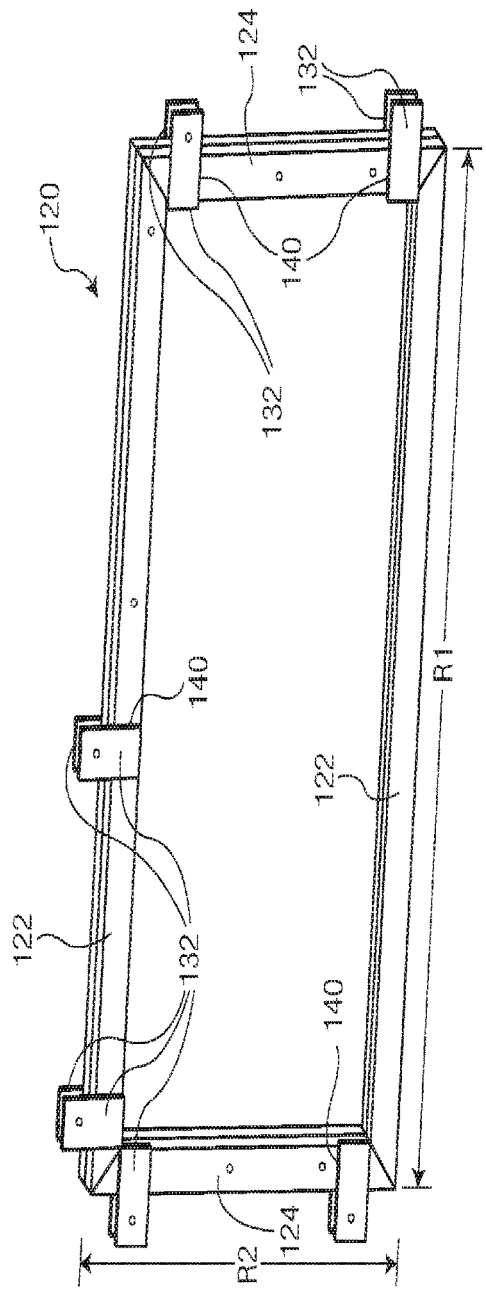
FIG. 4 is a perspective view of a second modular piece of the snow and ice remover of FIG. 1.

One of the plurality of second modular pieces 120 is shown in FIG. 4. The second modular piece 120 has a rectangular shape with a pair of opposite long sides 122 and a pair of opposite short sides 124 connecting the long sides 122. Each of the long sides 122 has a length RI and each of the short sides 124 has a length R2. In an embodiment, the length RI is equal to the length T1 and the length R2 is equal to the length T2. In the shown embodiment, the long sides 122 and the short sides 124 are each formed of a steel tubing and are welded together to form the second modular piece 120. In an alternative embodiment, the long sides 122 and the short sides 124 may be formed of a different material, such as plastic, and/or may be attached together to form the second modular piece 120 by any type of fastener known to those with ordinary skill in the art, such as a screw or a bolt.

The connectors 130 and the fasteners 140, as shown in FIGS. 1, 2, and 4, attach the first modular pieces 110 and the second modular pieces 120 together to form the frame 100 which includes a pair of vertical supports 150, a cross piece 160 connecting the vertical supports 150, and a plurality of outriggers 170 attached to the vertical supports 150.

In the embodiment shown in FIGS. 1 and 2, each of the vertical supports 150 includes a plurality of first modular pieces 110, a plurality of second modular pieces 120, and a plurality of first connectors 132 and the fasteners 140 connecting the first modular pieces 110 and the second modular pieces 120. As shown in FIG. 4, each of the first connectors 132 is a plate-shaped member formed of a metal material. In other embodiments, each first connector 132 maybe formed of a different material such as a plastic. Each fastener 140 is a nut and bolt in the shown embodiments. In other embodiments, each fastener 140 may be a screw, a weld, an adhesive, or any other type of fastener known to those with ordinary skill in the art.

To connect the first modular pieces 110 and the second modular pieces 120 in each vertical support 150, a first end of one first connector 132 is positioned to overlap the second modular piece 120 and a second end of the first connector 132 is positioned to overlap the first modular piece 110 or another second modular piece 120, referred to hereinafter as the other modular piece 110, 120, as shown in FIGS. 2 and 4. Two fasteners 140 are used to attach each first connector 132; one fastener 140 is used to attach the first end of the first connector 132 to the second modular piece 120 and another fastener 140 is used to attach the second end of the first connector 132 to the other modular piece 110, 120.

In the embodiment shown in FIGS. 1, 2, and 4, the fastener 140 attaching the first connector 132 to the second modular piece 120 is a weld and the fastener 140 attaching the first connector 132 to the other modular piece 110, 120 is a nut and bolt extending through a passageway in the first connector 132 and the other modular piece 110, 120. In other embodiments, both ends of the first connector 132 could be welded to the respective modular pieces 110, 120, both ends of the first connector 132 could be bolted to the respective modular pieces 110, 120, or other forms of fastening could be used to form the structure described below. In the embodiment shown in FIGS. 1, 2, and 4, the first connectors 132 are disposed in pairs on opposite sides of the respective modular pieces 110, 120. In other embodiments, only one first connector 132 may be used instead of the pairs.

Each of the vertical supports 150 is constructed identically, as will be described with reference to FIGS. I and 2. As shown in the embodiment of FIG. 2, one second modular piece 120 is positioned with a first long side 122 on a ground surface G. An opposite second longside 122 of the one second modular piece 120 is connected to the second base 114 of one first modular piece 110 and a first short side 124 of another second modular piece 120 by a plurality of first connectors 132 and a plurality of fasteners 140. The first base 112 of the one first modular piece 110 is connected to the long side 122 of the another second modular piece 120 by another plurality of first connectors 132 and fasteners 140. The second base 114 of another first modular piece 110 is connected to a second short side 124 of the another second modular piece 120 opposite the first short side 124 by another plurality of first connectors 132 and fasteners 140 to form the vertical support 150.

In the embodiment shown in FIGS. I and 2, each vertical support 150 includes two first modular pieces 110 and two second modular pieces 120. Each vertical support 150 has a height in a height direction H approximately equal to T1+RI+R2 which, in an embodiment, is approximately equal to 2.5×(T1 or RI). Each vertical support 150 has a largest length at the ground surface Gin a length direction L which is approximately equal to RI or T1, the length direction L being perpendicular to the height direction H. In other embodiments, the vertical supports 150 may include different quantities of first modular pieces 110 and second modular pieces 120 and the vertical support 150 may have a different overall shape. In a further embodiment, the frame 100 may have two first modular pieces 110 as a replacement for each second modular piece 120; in this embodiment, the triangular first modular pieces 110 are connected together to form a rectangle approximating the overall shape of the second modular piece 120.

The connection of the cross piece 160 of the frame 100 will now be described with reference to FIGS. 1, 2, and 5. The cross piece 160 includes a plurality of first modular pieces 110, a second connector 134 connecting the first modular pieces 110 to each other, a plurality of third connectors 136 connecting the first modular pieces 110 to the vertical supports 150, and a plurality of fasteners 140. The second connector 134 is a plate-shaped member and each of the third connectors 136 is an L-shaped bracket. In an embodiment, each of the second connector 134 and the third connectors 136 are formed of a metal material. In other embodiments, each of the second connector 134 and the third connectors 136 may be formed of a different material such as plastic.

As shown in FIGS. 1 and 2, a first end of the second connector 134 is positioned to overlap the first base 112 of one of the first modular pieces 110 and the opposite second end of the second connector 134 is positioned to overlap the first base 112 of the other of the first modular pieces 110. A plurality of fasteners 140 are used to attach the second connector 134 to each of the first modular pieces 110 to form the cross piece 160. In the shown embodiment, all of the fasteners 140 are nut and bolt fasteners. In an embodiment, the second connector 134 may be a pair of identical plates disposed on opposite sides of the first modular pieces 110.

Figure 5:
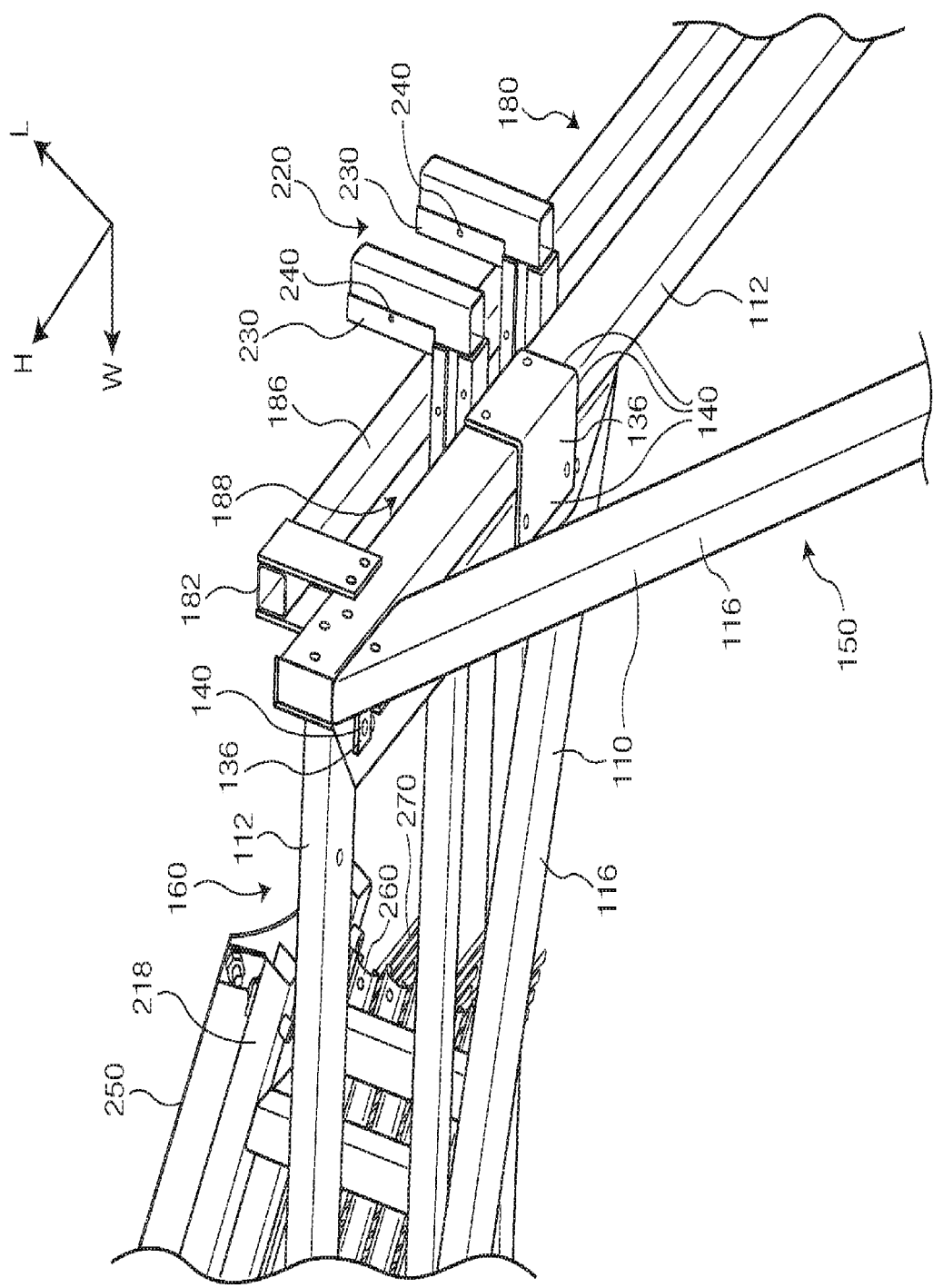
FIG. 5 is a detail perspective view of the snow and ice remover of FIG. 1.

In the embodiment shown in FIGS. 1, 2, and 5, the cross piece 160 includes two first modular pieces 110 and the cross-piece 160 has a width in a width direction W approximately equal to 2×T1. In other embodiments, the cross piece 160 may include different quantities of the first modular pieces 110 and/or may include second modular pieces 120, and the cross piece 160 may have a different overall shape.

The third connectors 136 connect the cross piece 160 to the vertical supports 150 as shown in FIGS. 1, 2, and 5. At each end of the cross piece 160, a plurality of third connectors 136 each have a first portion of the L-shape attached to the first modular piece 110 of the cross piece 160 by a fastener 140 and a second portion of the L-shape attached to the first modular piece 110 of the respective vertical support 150 by another fastener 140. Each fastener 140 is a nut and bolt in the shown embodiments. In other embodiments, each fastener 140 may be a screw, a weld, an adhesive, or any other type of fastener known to those with ordinary skill in the art.

The connection of the outriggers 170 to the vertical supports 150 will now be described with reference to an embodiment shown in FIGS. 1 and 2. Each of the outriggers 170 is one of the first modular pieces 110. There are four outriggers 170 in the embodiment shown in FIGS. 1 and 2. The second modular piece 120 of each vertical support 150 which abuts the ground surface G is connected to two first modular pieces 110 serving as the outriggers 170. The second base 114 of each first modular piece 110 is connected to one of the short sides 124 of the second modular piece 120 by a plurality of first connectors 132 and fasteners 140. The first modular pieces 110 serving as the outriggers 170 are positioned with the first base 112 abutting the ground surface G; at each vertical support 150, one of the first modular pieces 110 serving as the outrigger 170 extends in the length direction L and the other first modular piece 110 serving as the outrigger 170 extends in a direction counter to the length direction L, as shown in FIGS. 1 and 2.

Figure 7:
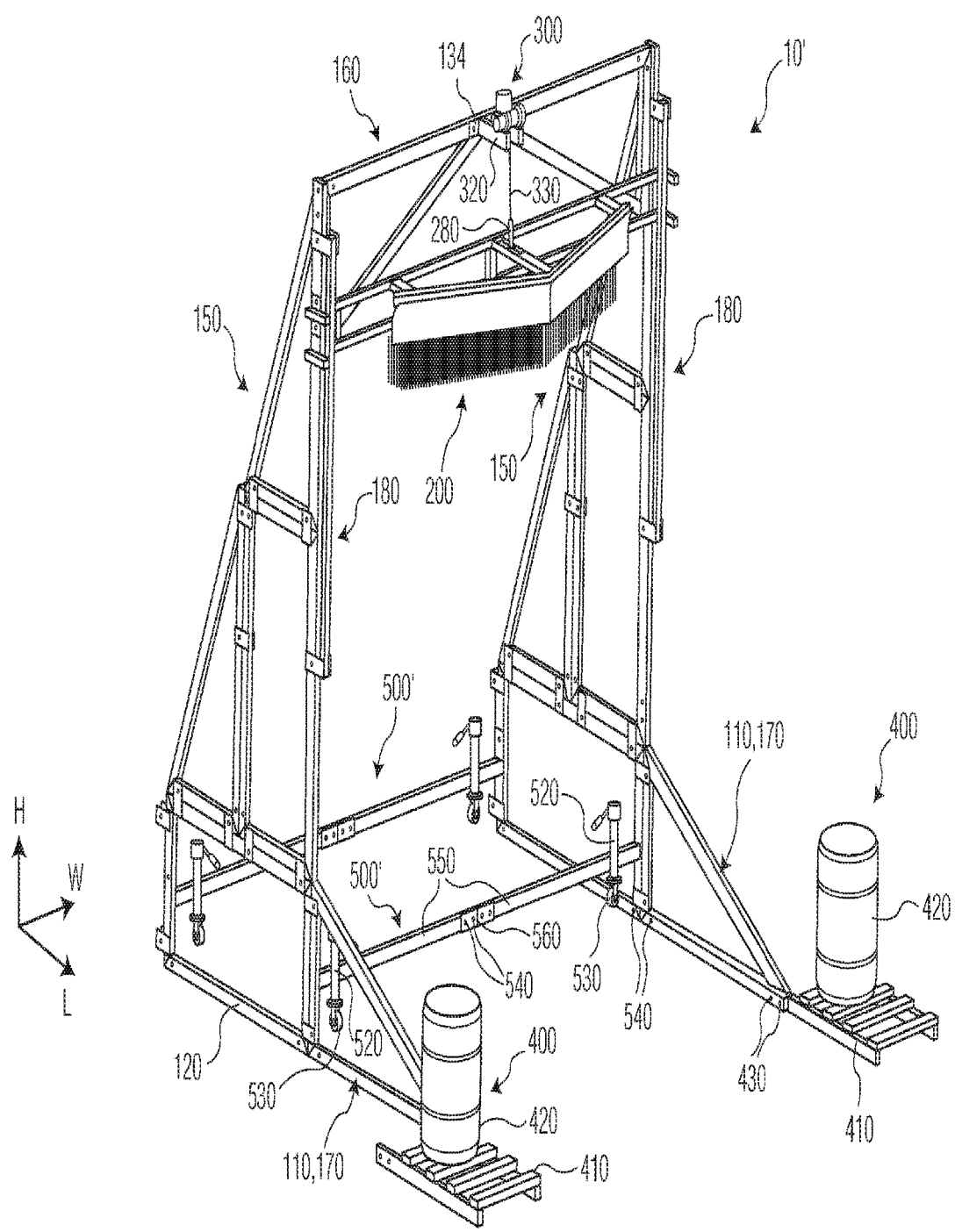
FIG. 7 is a perspective view of a snow and ice remover according to another embodiment.

In another embodiment of the snow and ice remover 10' shown in FIG. 7, there are only two first modular pieces 110 serving as the outriggers 170. One outrigger 170 is connected to the second modular piece 120 abutting the ground surface G at each of the vertical supports 170. The first modular piece 110 serving as the outrigger 170 for each vertical support 150 extends in the length direction L, as shown in FIG. 7. In another embodiment shown in FIG. 8, the snow and ice remover 10" does not include any outriggers 170.

The frame 100, as shown in FIGS. 1 and 2, also includes a plurality of plow retainers 180. Each plow retainer 180 is a U-shaped member. In an embodiment, the plow retainer 180 is formed of a metal material. In other embodiments, the plow retainer 180 may be formed of a plastic material. Each plow retainer 180 includes a first end section 182, an opposite second end section 184, and a retainer bar 186 connecting the first end section 182 and the second end section 184.

The first end section 182 and the second end section 184 of each plow retainer 180 are attached to one of the vertical supports 150 by a plurality of fasteners 140 as shown in FIG. 2. In the embodiment shown in FIGS. 1 and 2, the first end section 182 is attached to the first modular piece 110 which forms the top of the vertical support 150 in the height direction H and the second end section 184 is attached to the second modular piece 120 centrally positioned in the height direction H. In the shown embodiment, each of the fasteners 140 for the plow retainer 180 is a nut and bolt fastener. The retainer bar 186 is positioned spaced apart from the vertical support 150 to form a confined plow track 188 between each vertical support 150 and the respective plow retainer 180.

Figure 6:
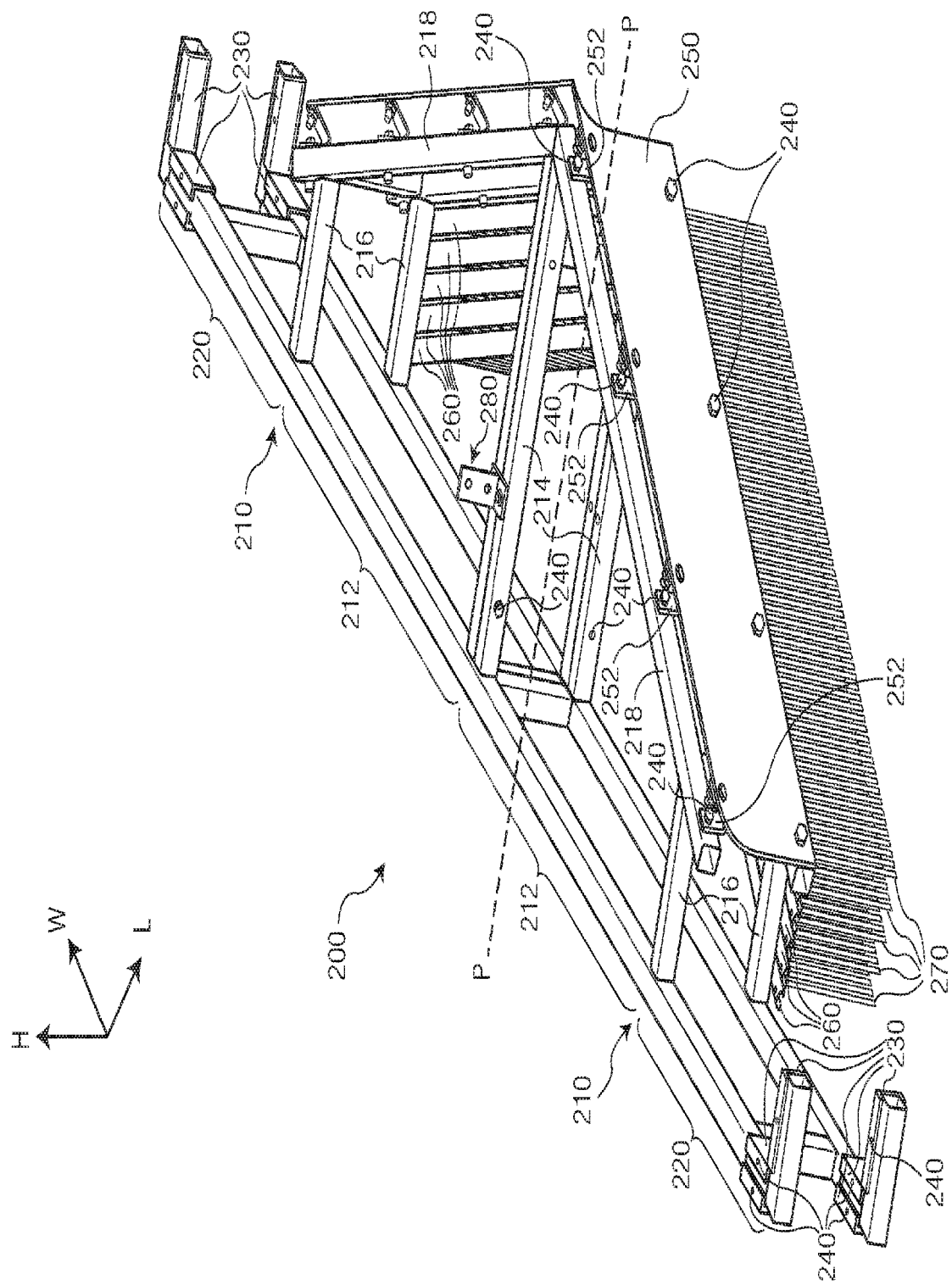
FIG. 6 is a perspective view of a plow assembly of the snow and ice remover of FIG. 1.

The plow assembly 200 is shown in FIG. 6 and includes a plurality of plow frame pieces 210, a plurality of wear pads 230 attached to the plow frame pieces 210, a plurality of fasteners 240, a plurality of plow sheets 250 attached to the plow frame pieces 210, a plurality of brush tracks 260 attached to the plow frame pieces 210, a plurality of brushes 270 attached to the brush tracks 260, and a lifting connector 280. As shown in FIG. 6, the plow assembly 200 is mirrored in the width direction W about a central axis P. The following description of the structure of the plow assembly 200 is directed to one half of the plow assembly 200 and, as shown in FIG. 6, applies equally to the other half.

Each of the plow frame pieces 210, as shown in FIG. 6, includes a rear section 212, an opposite front section 218 in the length direction L, and a long side section 214 and a short side section 216 connecting the rear section 212 and the front section 218. The long side section 214 and the short side section 216 each extend perpendicular to the rear section 212. The front section 218 is connected to an end of each of the long side section 214 and the short side section 216 and, due to the difference in length between the long side section 214 and the short side section 216, extends at an angle with respect to the rear section 212. The plow frame piece 210 further includes a bracket 220 connected to the rear section 212 and extending away from the rear section 212 in the width direction W. In the shown embodiment, the bracket 220 is L-shaped. In another embodiment, the bracket 220 may be T-shaped.

In the embodiment shown in FIG. 6, the sections 212, 214, 216, 218, and bracket 220 are each formed of a pair of parallel steel bars and are welded together to form the plow frame piece 210. In other embodiments, the sections 212, 214, 216, 218, and bracket 220 may be attached together by other fasteners known to those with ordinary skill in the art or the plow frame piece 210 may be monolithically formed. The plow frame pieces 210 are attached to each other as described in greater detail below to form a plow frame.

The wear pads 230, as shown in FIG. 6, are disposed on an end of the bracket 220. In the shown embodiment, each of the wear pads 230 is a U-shaped member formed of ultra-high- molecular-weight (UHMW) polyethylene. In other embodiments, the wear pads 230 may be formed of any other polymer material known to those with ordinary skill in the art that exhibits resistance to wear. The wear pads 230 are positioned to partially surround the end of the bracket 220 and are each secured to the bracket 220 by a plurality of fasteners 240. In an embodiment, the fasteners 240 securing the wear pads 230 are set screws. In other embodiments, the fasteners 240 may be nuts and bolts, an adhesive, or any other type of known fastener.

The plow sheet 250, as shown in FIG. 6, is attached to the front section 218 of the plow frame piece 210 by a plurality of plow sheet connectors 252 and a plurality of fasteners 240. In the shown embodiment, the plow sheet 250 is formed of a polypropylene material. In other embodiments, the plow sheet 250 may be formed of any other polymer material or a metal material.

As shown in FIG. 6, a bottom end of the plow sheet 250 in the height direction His secured directly to the front section 218 by the fasteners 240. An opposite top end of the plow sheet 250 is attached to the plurality of plow sheet connectors 252 by the fasteners 240. Each of the plow sheet connectors 252 is V-shaped member; one side of the V-shape is attached to the top end of the front section 218 by the fasteners 240 and the other side of the V-shape is attached to the top end of the plow sheet 250. Each of the plow sheet connectors 252 holds the top end of the plow sheet 250 at a distance from the front section 218. The plow sheet 250 is thus curved at the top end; the plow sheet 250 may be formed in a bent shape or may be bent during installation on the plow frame piece 210. In the shown embodiment, the fasteners 240 securing the plow sheet 250 to the front section 218 of the plow frame piece 210 are nuts and bolts.

The plurality of brush tracks 260, as shown in FIG. 6, are attached to a bottom of each of the long side section 214 and the short side section 216 and extend parallel to the front section 218. In the shown embodiment, the brush tracks 260 are formed of a metal material and are welded to the long side section 214 and the short side section 216. In other embodiments, the brush tracks 260 may be formed of a plastic material and fastened to the long side section 214 and short side section 216 by any fastener known to those with ordinary skill in the art.

The plurality of brushes 270 are attached to and extend from the brush tracks 260 in the height direction H. The brushes 270 are formed of a polypropylene, polyethylene, or any other non-abrasive, flexible, resilient material. In the shown embodiment, five rows of brushes 270 extend from the brush tracks 260 and each of the rows has a same height in the height direction H. In other embodiments, the number of rows of brushes 270 may vary and brushes 270 in adjacent rows may have different heights. In an alternative embodiment, a flexible squeegee-type blade may be attached to the bottom of each of the long side section 214 and the short side section 216 in lieu of the brush tracks 260 and brushes 270.

To construct the plow assembly 200, as shown in FIG. 6, the plow frame pieces 210 assembled as described above are attached at their long side sections 214 by a plurality of fasteners 240. The lifting connector 280 is attached to a top of the connected long side sections 214 and extends upward in the height direction H. In the constructed plow assembly 200, the plurality of plow sheets 250 form a V-shape, the plurality of brushes 270 form a V-shape, and the brackets 220 with the wear pads 230 are disposed at opposite ends.

The plow assembly 200 is attached to the frame 100 as shown in FIGS. 1, 2, and 5. At each of the vertical supports 150, and at each end of the plow assembly 200, the plow retainer 180 is attached around the bracket 220. A first portion of the bracket 220 is disposed in the plowtrack 188 between the vertical support 150 and the retainer bar 186, limiting movement of the bracket 220 in the length direction L. A second portion of the bracket 220 perpendicular to the first portion extends in the length direction L around the retainer bar 186, limiting movement of the bracket 220 in the width direction W. The wear pads 230 are disposed on each surface of the bracket 220 that faces either the vertical support 150 or the retainer bar 186.

Figure 8:
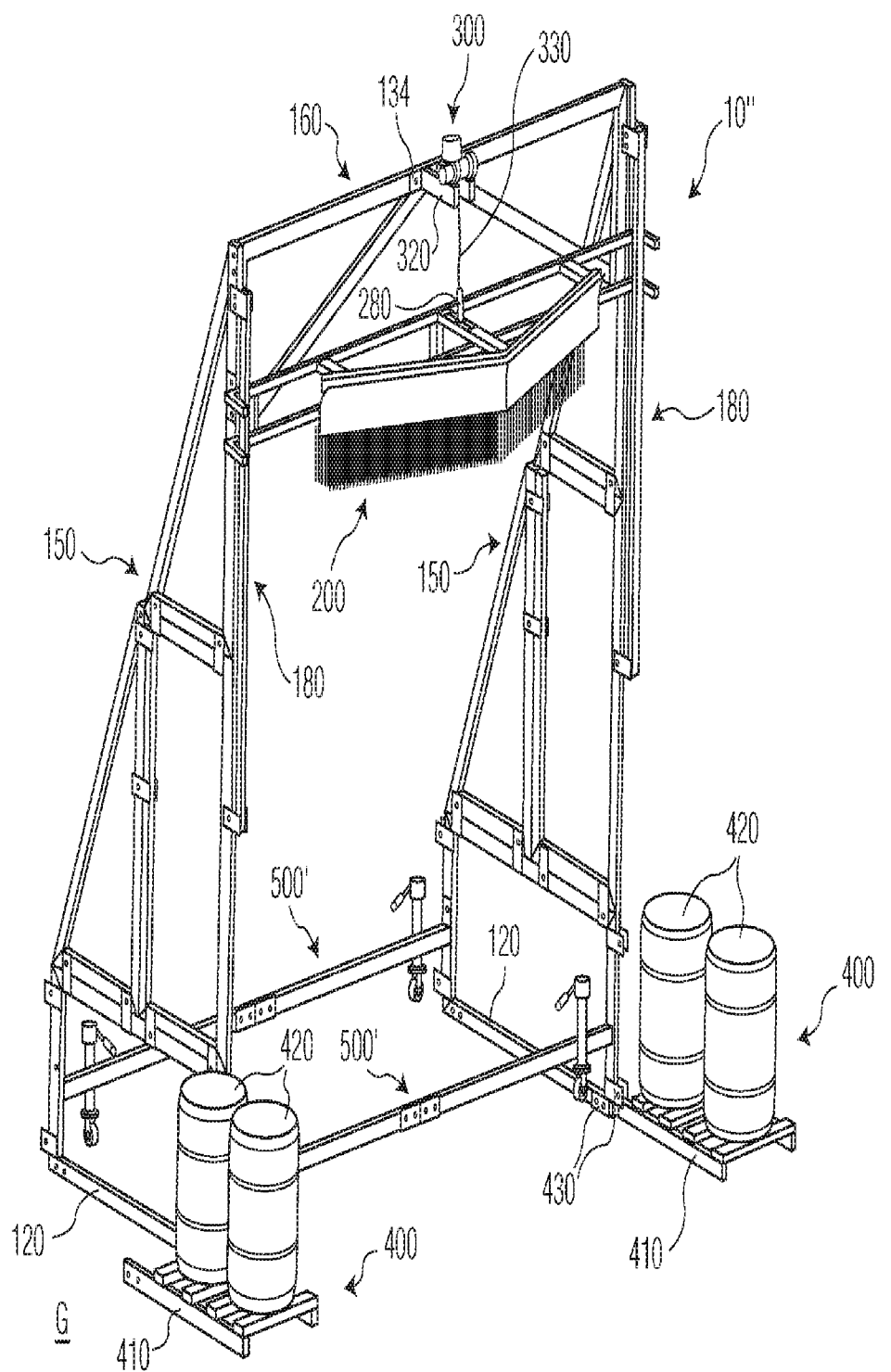
FIG. 8 is a perspective view of a snow and ice remover according to another embodiment.

The lifting device 300 is shown in FIGS. 1, 7, and 8 and includes a winch 310, a lifting support 320, and a chain 330. The lifting support 320 is welded to the second connector 134 and the winch 310 is disposed on and supported by the lifting support 320. The winch 310 may be any type of conventional winch known to those with ordinary skill in the art. The winch 310 is connected to a conventional control station (not shown) at the ground surface G from which an operator can control the operation of the winch 310. The chain 330 extends from the winch 310 and is connected to the lifting connector 280 of the plow assembly 200. Operation of the winch 310, via the chain 330, moves the plow assembly 200 within the plow tracks 188 along the height direction H. In other embodiments, the chain 330 may be a wire rope or a cable.

The ballast 400 is shown in FIGS. 1, 2, 7, and 8. In the shown embodiment, the ballast 400 includes a platform 410 and a weight 420. The platform 410 is a known pallet used in conventional shipping applications and is sized to receive a standard pallet jack J as shown in FIGS. 1 and 2. In various embodiments, the platform 410 may be an approximately 4'×4' small pallet or may be an approximately 8'×4' large pallet. The platform 410 supports the weight 420. In the shown embodiment, the weight 420 is a 55-gallon drum filled with a heavy material such as sand. In other embodiments, the weight 420 may be a concrete block. In an alternative embodiment, each of the ballasts 400 is a custom cast block capable of receiving the pallet jack J and therefore serving as both the platform 410 and the weight 420.

In the embodiment shown in FIGS. 1 and 2, the snow and ice remover 10 includes four ballasts 400. The platform 410 of each ballast 400 is attached to an end of one of the outriggers 170 by a plurality of fasteners 430. The fasteners 430 are nuts and bolts in the shown embodiment. In other embodiments, the fasteners 430 may be screws, an adhesive, or any other fastener known to those with ordinary skill in the art. Each platform 410 supports one filled drum serving as the weight 420.

In the embodiment shown in FIG. 7, the snow and ice remover 10' includes two ballasts 400. The platform 410 of each ballast 400 is attached to an end of one of the outriggers 170 by a plurality of fasteners 430. The fasteners 430 are nuts and bolts in the shown embodiment and each platform 410 supports one filled drum serving as the weight 420.

In the embodiment shown in FIG. 8, the snow and ice remover 10" includes two ballasts 400. The platform 410 of each ballast 400 is attached to the second modular piece 120 of each vertical support 150 which is disposed on the ground surface G by a plurality of fasteners 430. The fasteners 430 are nuts and bolts in the shown embodiment and each platform 410 supports a pair of filled drums serving as the weight 420.

An embodiment of the wheel assemblies 500 is shown in FIG. 1. Each wheel assembly 500 includes a wheel support 510, a jack 520 attached to the wheel support 510, and a wheel 530 disposed on an end of the jack 520. As shown in FIG. 1, a plurality of fasteners 540 attach the wheel support 510 to the second modular piece 120 of the vertical support 150 which is disposed on the ground surface G. The jacks 520 support the wheel 530 on the wheel support 510; a user can operate the jack 520 to raise and lower the wheel 530 with respect to the wheel support 510 and the vertical support 150, moving the wheel 530 into contact with the ground surface G or out of contact with the ground surface G. In an embodiment, the wheel 530 is mounted on a caster on the jack 520. In the embodiment shown in FIG. 1, two wheel assemblies 500 are attached to the second modular piece 120 of each vertical support 150 which is disposed on the ground surface G.

Another embodiment of the wheel assemblies 500' is shown in FIGS. 7 and 8. Each wheel assembly 500' includes a pair of rack bars 550, a rack connector 560 connecting the pair of rack bars 550, a pair of jacks 520 attached to the rack bars 550, and a wheel 530 disposed on an end of each jack 520. The rack connector 560 attaches an end of one rack bar 550 to an end of the other rack bar 550 other with a plurality of fasteners 540. In an embodiment, a tow attachment is disposed on the rack connector 560. An end of each rack bar 550 opposite the rack connector 560 is attached to the second modular piece 120 of one of the vertical supports 150 which is disposed on the ground surface G by the fasteners 540. The fasteners 540 are nuts and bolts in the shown embodiment. The jacks 520 are attached to the rack bars 550 at positions adjacent the vertical supports 150. The wheel assemblies 500' extend between and connect the second modular piece 120 of each vertical support 150 which is disposed on the ground surface G.

The usage of the snow and ice remover 10 will now be described in greater detail with reference to FIGS. 1 and 2. The description of the usage of the snow and ice remover 10 applies equally to the snow and ice remover 10' of FIG. 7 and the snow and ice remover 10" of FIG. 8 unless explicitly noted otherwise.

In a completely deconstructed state, all of the parts of the snow and ice remover 10, including most notably the first modular pieces 110, the second modular pieces 120, and the plow retainer 180 of the frame 100, the plow frame pieces 210, plow sheets 250, brush tracks 260, and brushes 270 of the plow assembly 200, and the parts of the wheel assemblies 500, 550'are sized to fit into a 4' by 8' footprint. In an embodiment, all of the parts fit on a 4' by 8' standard shipping pallet in the completely deconstructed state, lessening material shipping costs.

A user receiving the snow and ice remover 10 requires only a standard forklift, a pallet jack J, and the standard fasteners 140, 240, 430, 540, to assemble the snow and ice remover 10. The user first assembles the cross piece 160 and the plow assembly 200 as described above, attaching the lifting device 300 to the cross piece 160. The user then begins to assembly each vertical support 150 from the top-down and attaches to the plow retainer 180 to retain the plow assembly 200 within the plow track 188 when a sufficient amount of the vertical supports 150 have been assembled. After completing assembly of each vertical support 150, the user attaches the outriggers 150 to the vertical supports 150 and the ballasts 400 to either the vertical supports 150 or the outriggers 170 as described above. The wheel assembles 500 may be attached before and during use of the snow and ice remover 10 but the wheel assemblies 500' must be removed during use.

Once assembled, the user uses the winch 310 to set the height of the plow assembly 200 in the height direction H. The plow assembly 200 is movable within the plow tracks 188 along the height direction H and is delimited by the position of the first end section 182 and the second end section 184. In case the chain 330 were to break, the second end section 184 acts as a safety stop preventing the plow assembly 200 from free-falling to the ground surface G. As the plow assembly 200 moves along the plow track 188, only the wear pads 230 on the brackets 220 contact the vertical support 150 and the plow retainer 180, suppressing noise during movement of the plow assembly 200 and allowing for easy replacement and prolonging the operational life of the plow assembly 200.

With the position of plow assembly 200 set, a vehicle is slowly driven through the snow and ice remover 10 in the direction of the arrow A shown in FIG. 1. In an embodiment, the vertical supports 150 and plow retainer 180 allow a bottom of the plow sheets 250 to be positioned to accommodate vehicles ranging from a van, at approximately 7' from the ground surface G, to a semi-trailer, at approximately 13' 6" from the ground surface G. The brushes 270 and plow sheets 250 contact the roof of the vehicle and clear snow and ice from the roof as the vehicle passes under the plow assembly 200. The V-shape of the plow sheets 250 and brushes 270 move snow and ice off the sides of the vehicle roof while the curved top of the plow sheets 250 prevents the snow and ice from moving over the plow assembly 200. The optional outriggers 170 and the ballasts 400 positioned at least on an inlet side in which the snow and ice remover 10 enters the snow and ice remover 10 prevent the snow and ice remover 10 from tipping under the force of the snow removal as the vehicle drives through. In other embodiments, the plow assembly 200 may be any roof clearing device capable of clearing snow and ice from the roof of the vehicle.

The assembled snow and ice remover 10 can also be moved between uses. A user positions a pallet jack J under each platform 410 and uses the pallet jack J to raise the platform 410 off of the ground surface G.

In the embodiment shown in FIGS. 1 and 2, in the already attached wheel assemblies 500, the user operates the jacks 520 to lower the wheels 530 onto ground surface G, lifting the frame 100 off the ground surface G and supporting the weight of the snow and ice remover 10 on the wheels 530. The user can then manually move the snow and ice remover 10 to a desired location before raising the wheels 530 and removing the pallet jacks J to place the snow and ice remover 10 back on the ground surface G.

In the embodiments shown in FIGS. 7 and 8, the user attaches the wheel assemblies 500' between the two vertical supports 150. The user then operates the jacks 520 to lower the wheels 530 onto the ground surface G. The user can then manually move the snow and ice remover 10', 10". In an alternative, a vehicle can attach to the wheel assembles 500' and tow the snow and ice remover 10', 10"; the wheel assemblies 500' stabilize the snow and ice remover 10', 10" and prevent racking during movement. The snow and ice remover 10', 10" is also unable to be moved without the stabilization added by the wheel assemblies 500'.

Figure 9:
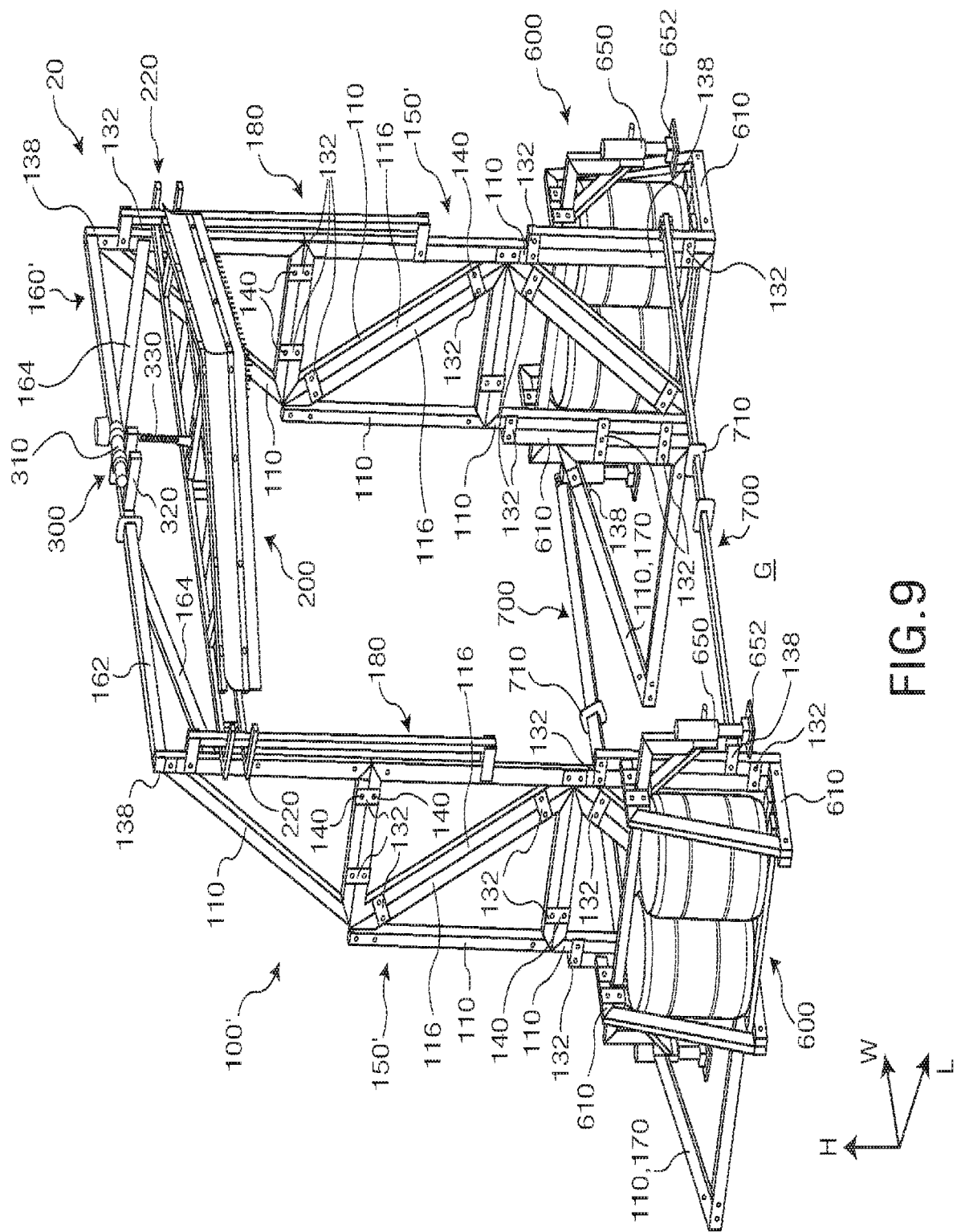
FIG. 9 is a perspective view of a snow and ice remover according to another embodiment.
Figure 10:
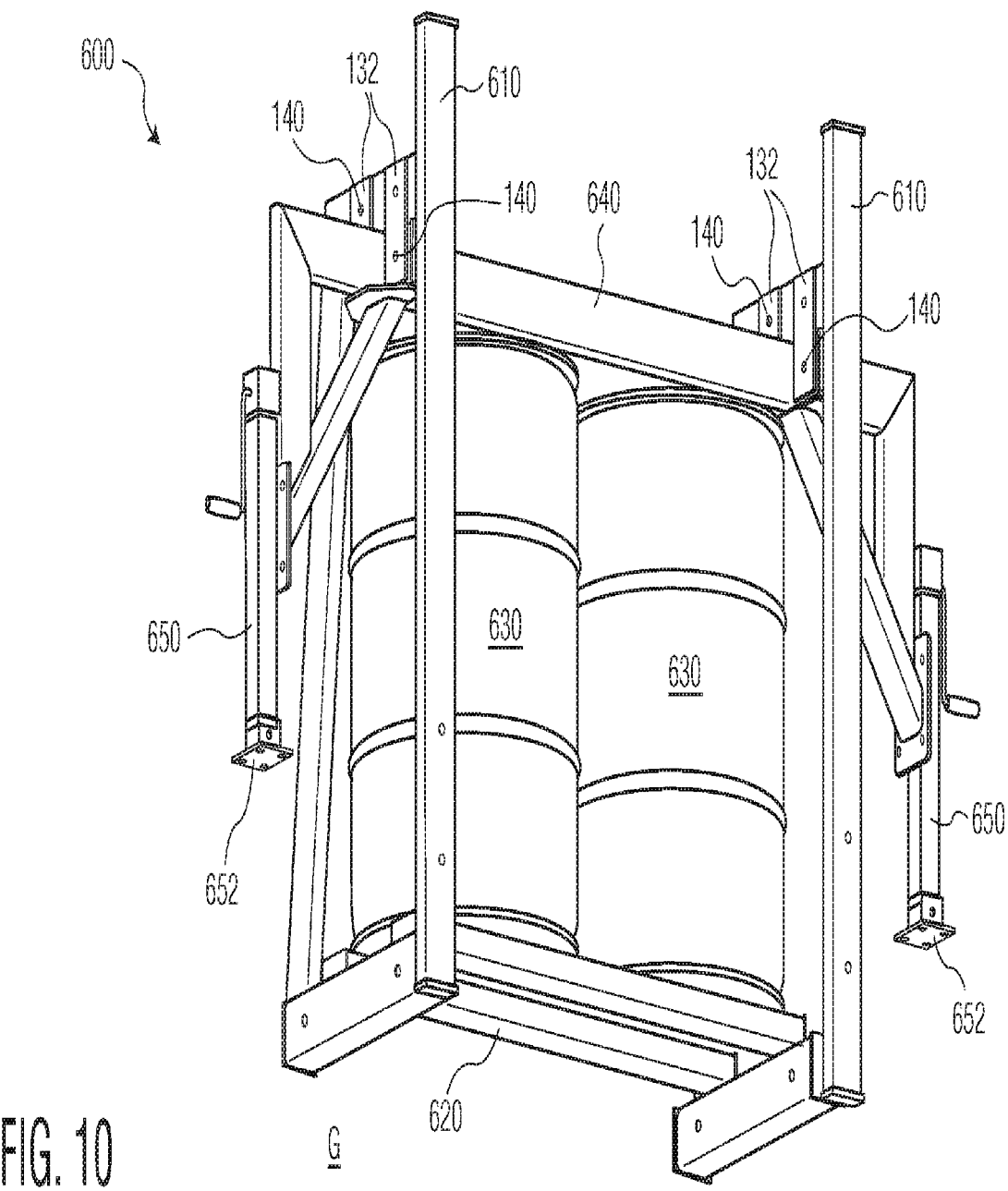
FIG. 10 is a perspective view of a ballast assembly of the snow and ice remover of FIG. 9.

A snow and ice remover 20 according to another embodiment is shown in FIGS. 9 and 10. Like reference numbers refer to like elements and only the differences from the embodiments shown in FIGS. 1-8 will be described in detail herein. The snow and ice remover 20 includes a frame 100', the plow assembly 200 supported by and movable along the frame 100' by the lifting device 300, and a pair of ballast assemblies 600 attached to the frame 100'.

The frame 100' of the snow and ice remover 20, as shown in FIG. 9, includes a pair of vertical supports 150', a cross piece 160' connecting the vertical supports 150', and a plurality of outriggers 170.

In the embodiment shown in FIG. 9, each of the vertical supports 150' includes a plurality of first modular pieces 110 connected together by a plurality of first connectors 132 and a plurality of fasteners 140. Neither of the vertical supports 150' includes any second modular piece 120. Each of the vertical supports 150' is constructed identically.

In the shown embodiment, each vertical support 150' includes five first modular pieces 110 and has a height in the height direction H approximately equal to 3×T1. Each vertical support 150' has a length at the ground surface G in the length direction L which is approximately equal to T2. One first modular piece 110 is positioned with the second base 114 on the ground surface G. The hypotenuse 116 of the one first modular piece 110 is connected to the hypotenuse 116 of another first modular piece 110 by a plurality first connectors 132 and a plurality of fasteners 140 to form an approximately rectangular shape. Another rectangular shape is similarly formed and connected to the first rectangular shape, and another first modular piece 110 is connected in the height direction H to form the vertical support 150'. In other embodiments, the vertical supports 150' may include different quantities of first modular pieces 110.

In the embodiment shown in FIG. 9, the cross piece 160' is a single monolithically formed piece including a cross bar 162 and a pair of triangle-shaped supports 164 extending from the cross bar 162. Opposite ends of the cross bar 162 are each attached to one of the vertical supports 150' by a fourth connector 138 and an end of each triangle-shaped support 164 opposite a center of the cross-bar 162 is attached to one of the vertical supports by one of the first connectors 132. In the shown embodiment, the fourth connector 138 is an H-shaped bracket. The lifting support 320 of the lifting device 300 is attached to an approximate center of the crossbar 162.

As shown in the embodiment of FIG. 9, each of the outriggers 170 is one of the first modular pieces 110. There are two outriggers 170 in the embodiment shown in FIG. 9. Each of the outriggers 170 is attached to one of the ballast assemblies 600 as described in greater detail below.

The snow and ice remover 20, as shown in FIGS. 9 and 10, includes a pair of ballast assemblies 600 instead of the ballasts 400 and wheel assemblies 500 of the embodiments of FIGS. 1-8. Each of the ballast assemblies 600, as shown in FIG. 10, includes a pair of side supports 610, a platform 620 connected between the side supports 610, a plurality of weights 630 positioned on the platform 620, a jack support 640 connected to the side supports 610, and a pair of jacks 650 connected to the jack support 640.

As shown in FIG. 10, each of the pair of side supports 610 has an approximately right trapezoidal shape. In the shown embodiment, the side supports 610 are each formed of the steel tubing and are welded together. In an alternative embodiment, the side supports 610 are formed of a plurality of pieces and are attached together to form the side supports 610 by any other type of fastener known to those with ordinary skill in the art, such as a screw or a bolt.

The platform 620, as shown in FIG. 10, is attached to a bottom portion of each of the side supports 610 and extends between the side supports 610. The weights 630 are positioned on the platform 620 and are held off of the ground surface G by the platform 620. In the shown embodiment, each of the weights 630 is a 55-gallon drum filled with a heavy material such as sand. In other embodiments, the weight 630 may be a concrete block.

As shown in FIG. 10, the jack support 640 is attached to an upper portion of each of the side supports 610 by a plurality of first connectors 132 and a plurality of fasteners 140. The jacks 650 are connected to opposite ends of the jack support 640 and are positioned exterior of the side supports 610. The jacks 650 are operable to raise and lower an engaging portion 652 of the jack 650, moving the engaging portion 652 into contact with the ground surface G and out of contact with the ground surface G. In the shown embodiment, the engaging portion 652 is a flat surface. In other embodiments, the engaging portion 652 could be a wheel.

As shown in FIG. 9, each of the ballast assemblies 600 is attached to one of the vertical supports 150'. The bottom portion of each of the side supports 610 is positioned on the ground surface G and first connectors 132 attach each of the pair of side supports 610 to one of the first modular pieces 110. Each of the outriggers 170 is attached to one of the side supports 610 of each of the ballast assemblies 600 by first connectors 132. The jacks 650 are operable to raise and lower the engaging portions 652 in order to engage the ground surface G and lift the snow and ice remover 20 off of the ground surface G in the height direction H. In the embodiment of FIG. 9, due to the structure of the ballast assemblies 600, the weights 630 can remain on the platform 620 while the snow and ice remover 20 is lifted off of the ground surface G. In an embodiment in which the engaging portions 652 are wheels, the snow and ice remover 20 can then be moved in the lifted position.

The snow and ice remover 20, as shown in FIG. 9, includes a pair of rack bars 700. Each of the rack bars 700 has a tow attachment 710 disposed approximately centrally on the rackbar 700. The tow attachment 710 is adapted to connect to a tow cable of the vehicle. Opposite ends of the rack bar 700 are attached between the vertical supports 150' to either one of the side supports 610 of the ballast assemblies 600 or to the outriggers 170. In the shown embodiment, each end of each of the rack bar 700 is attached by a fourth connector 138. The rack bars 700 are attached to the snow and ice remover 20 while the snow and ice remover 20 is being moved to prevent racking and increase stabilization during movement. The rack bars 700 are removed from the snow and ice remover 20 at the fourth connectors 138 to permit a user to drive a vehicle through the snow and ice removal 20.

Figure 11:
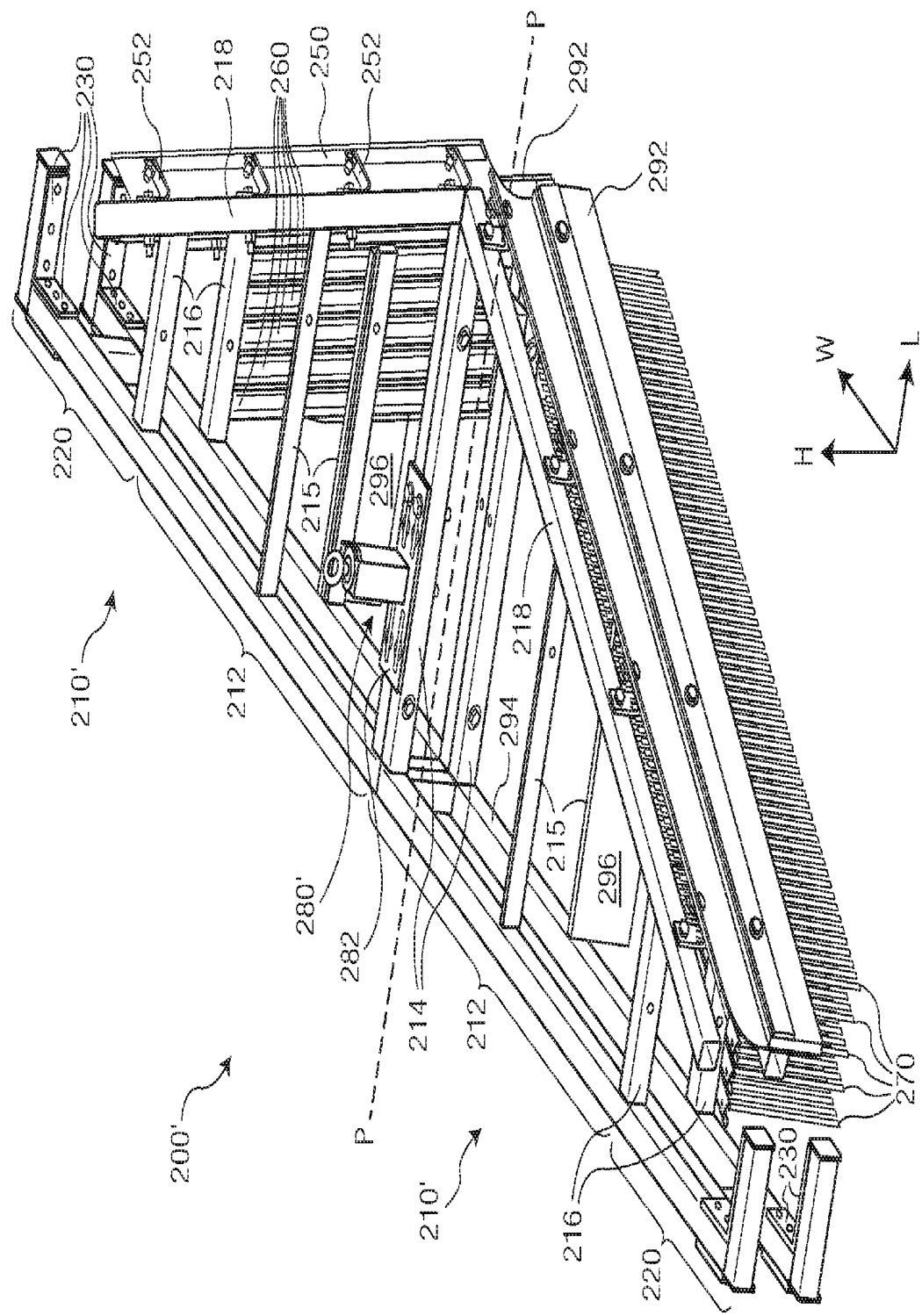
FIG. 11 is a perspective of a plow assembly according to another embodiment.
Figure 12:
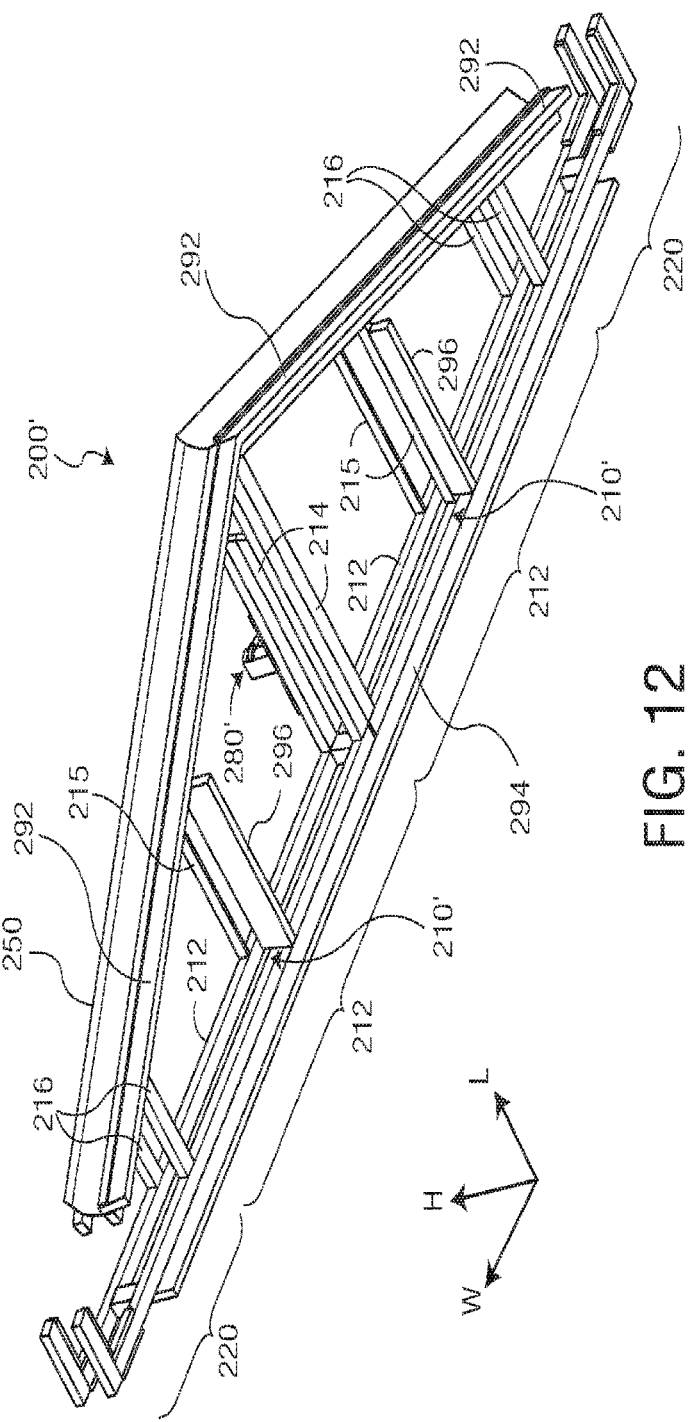
FIG. 12 is a perspective view of the plow assembly of FIG. 11 without a plurality of brushes of the plow assembly.
Figure 13:
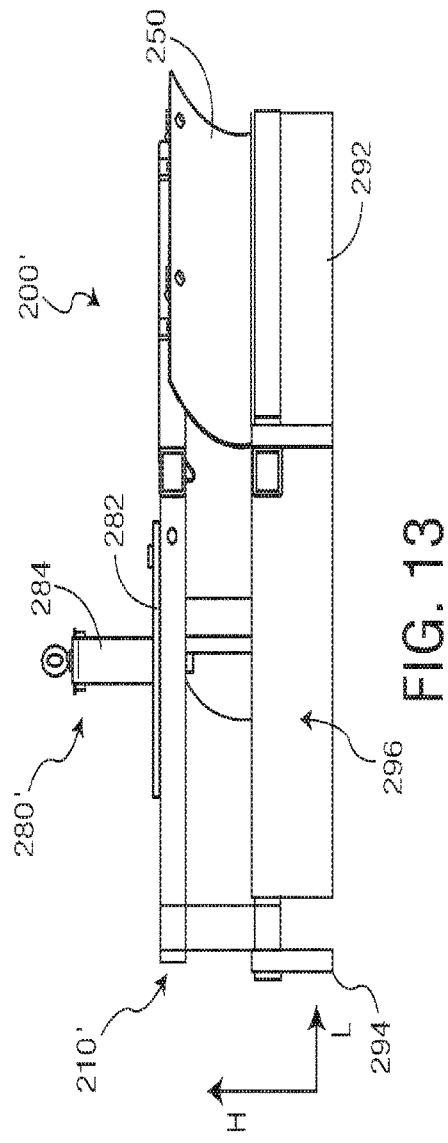
FIG. 13 is a side view of the plow assembly of FIG. 11 without the plurality of brushes.

A plow assembly 200' according to another embodiment is shown in FIGS. 11-13. Like reference numbers refer to like elements, and only the differences from the plow assembly 200 shown in FIG. 6 will be described in detail herein. A plurality of plow frame pieces 210' and a lifting connector 280' of the plow assembly 200' differ from the plow frame pieces 210 and the lifting connector 280 of the plow assembly 200. Further, as described in greater detail below, the plow assembly 200' includes a plurality of flexible blades 290.

As shown in FIGS. 11 and 12, each of the plow frame pieces 210' includes an intermediate side section 215 connecting the rear section 212 and the front section 218. The intermediate side section 215 extends perpendicular to the rear section 212 and is disposed between the long side section 214 the short side section 216. In the shown embodiment, the intermediate side section 215 is disposed approximately centrally between the long side section 214 and the short side section 216 in the width direction W. The front section 218 is connected to an end of the intermediate section 215 and, due to the difference in length between the long side section 214, the intermediate side section 215, and the short side section 216, extends at an angle with respect to the rear section 212. In the plow assembly 200', each of the plow frame pieces 210' is mirrored in the width direction W about the central axis P.

In the shown embodiment, the sections 212, 214, 215, 216, 218, and bracket 220 are each formed of a pair of parallel steel bars and are welded together to form the plow frame piece 210'. In other embodiments, the sections 212, 214, 215, 216, 218, and bracket 220 may be attached together by other fasteners known to those with ordinary skill in the art or the plow frame piece 210' may be monolithically formed.

The lifting connector 280', as shown in FIGS. 11 and 13, includes a lifting plate 282 and a damper 284 connected to the lifting plate 282. The lifting plate 282 is attached to a top of the connected long side sections 214 of the plow frame pieces 210'. The damper 284 is attached to the lifting plate 282 and extends upward in the height direction H. The damper 284 includes an internal spring that is capable of elastically compressing between a relaxed state and a compressed state and provides a dampening force in the height direction H during compression.

The plurality of flexible blades 290, as shown in FIGS. 11-13, include a plurality of plow flexible blades 292, a transverse frame flexible blade 294, and a plurality of inline frame flexible blades 296. In an embodiment, each of the flexible blades 290 is a squeegee-type blade and may be formed of a rubber material, a plastic material, or any other type of durable, flexible material known to those with ordinary skill in the art and used in squeegee-type applications.

As shown in FIGS. 11-13, each of the plow flexible blades 292 is attached to an exterior surface of one of the plow sheets 250 and extends down from the plow sheets 250 in the height direction H; the plow flexible blades 292 extend in the same direction as the plurality of brushes 270 and are positioned below the plow frame pieces 210' in the height direction H. The plow flexible blades 292 can be used in conjunction with the brushes 270, as shown in the embodiment of FIG. 11, or can be used in lieu of the brushes 270, as shown in the embodiment of FIGS. 12 and 13. The plow flexible blades 292 form a V-shape and extend at an angle with respect to the width direction W and the length direction L.

The transverse frame flexible blade 294, as shown in FIGS. 11-13, is attached to the rear section 212 and a portion of the bracket 220 of each of the plow frame pieces 210' and extends in the width direction W. The inline frame flexible blades 296 are attached to the intermediate side section 215 of each of the plow frame pieces 210' and extend in the length direction L. In another embodiment, only the plow flexible blades 292 are provided and the transverse frame flexible blade 294 and the inline frame flexible blades 296 are omitted. In another embodiment, only the plow flexible blades 292 and the transverse frame flexible blade 294 are provided and the inline frame flexible blades 296 are omitted.

As shown in FIG. 13, a bottom of each of the plow flexible blades 292, the transverse frame flexible blade 294, and the inline frame flexible blades 296 are aligned and have a same height in the height direction H below the plow frame pieces 210'. In the embodiment of FIG. 11, the brushes 270 extend below the bottom of each of the plow flexible blades 292, the transverse frame flexible blade 294, and the inline frame flexible blades 296.

The use of the plow assembly 200' shown in FIGS. 11-13 within the snow and ice remover 10, 10', 10'', 20 will now be described in greater detail. The chain 330 extending from the winch 310 is connected to the damper 284 of the lifting connector 280' and the brackets 220 are disposed in the plow track 188 as described above with respect to the plow assembly 200. In various embodiments, the chain 330 may be a linked chain, or alternatively may be a wire rope or a cable.

The winch 310 is used to set the height of the plow assembly 200'. The plow flexible blades 292 are positioned on a front end of the roof of the vehicle and, in order for the plow assembly 200' to stably abut the roof of the vehicle, a small triangle of snow may be left behind the plow flexible blades 292 in the length direction L at a front end of the roof The brushes 270, plow flexible blades 292, and plow sheets 250 move along the roof of the vehicle as the vehicle moves in the length direction L and clear snow and ice from the roof as the vehicle passes under the plow assembly 200'.

The transverse frame flexible blade 294 clears any small triangle of snow left at the frontend of the roof of the vehicle and also clears any other snow or ice that may have been missed by the brushes 270, the plow sheets 250, or the plow flexible blades 292. Further, as the plow flexible blades 292 and the transverse frame flexible blade 294 abut the roof at a same height in the height direction H, the plow assembly 200' remains stable as the vehicle passes under the plow assembly 200'. The inline frame flexible blades 296 further increase the stability of the plow assembly 200' by abutting the roof at the same height in the height direction Hand, in an embodiment, are positioned to rest on the front end of the roof when the plow assembly 200' is lowered onto the roof.

When the plow assembly 200' reaches a rear end of the roof of the vehicle and the plow flexible blades 292 have passed beyond the rear end of the vehicle, the transverse frame flexible blade 294 and the inline frame flexible blades 296 remain in contact with the roof By maintaining the height of the plow assembly 200' in the height direction H, the transverse frame flexible blade 294 and the inline frame flexible blades 296 prevent the plow assembly 200' from falling in the height direction H at the rear end of the vehicle and prevent the plow frame pieces 210' from potentially contacting the roof of the vehicle. The compression of the damper 284 and the resulting dampening force of the damper 284 further limits any gravitational force with which the plow assembly 200' may drop at the rear end of the vehicle.

What is claimed is:

1. A vehicle snow and ice remover, comprising:
a plurality of first modular frames, the first modular frames having a first shape,
a plurality of second modular frames, the second modular frames having a second shape different than the first shape, the second modular frames include a plurality of first modular frames coupled together to provide the second shape, the first modular frames and the second modular frames to be connected to form a first side frame and a second side frame opposite the first side frame; and
a cross frame connecting the first side frame and the second side frame.

2. The vehicle snow and ice remover of claim 1, wherein the first shape is a triangle and the second shape is a rectangle.

3. The vehicle snow and ice remover of claim 2, wherein the first modular frames each has a first base having a first length T1, a second base having a second length T2, and a hypotenuse connecting the first base and the second base, wherein the first length T1 is greater than the second length T2, and wherein the second modular frames each has a pair of opposite long sides and a pair of opposite short sides connecting the opposite long sides, wherein each of the opposite long sides has a third length R1 and each of the opposite short sides has a fourth length R2.

4. The vehicle snow and ice remover of claim 3, wherein the second length T2 is approximately half of the first length T1, and wherein the first length T1 is equal to the third length R1 and the second length T2 is equal to the fourth length R2.

5. The vehicle snow and ice remover of claim 4, wherein each of the first side frame and the second side frame has a height in a vertical direction that is equal to a sum of the first length T1, the third length R1, and the fourth length R2.

6. The vehicle snow and ice remover of claim 5, wherein the cross frame has a width in a horizontal direction between the first side frame and the second side frame that is equal to two times the first length T1.

7. The vehicle snow and ice remover of claim 1, wherein the first side frame and the second side frame include at least one of the first modular frames and the second modular frames.

8. The vehicle snow and ice remover of claim 1, wherein the cross frame includes the first modular frames and does not include any of the second modular frames.

9. The vehicle snow and ice remover of claim 1, further comprising a plurality of first connectors and a plurality of fasteners to couple the first modular frames and the second modular frames to form the first side frame and the second side frame.

10. The vehicle snow and ice remover of claim 9, further including a plurality of second connectors to couple the cross frame to the first side frame and the second side frame.

11. The vehicle snow and ice remover of claim 1, wherein a first one of the second modular frames includes two first modular frames coupled together.

12. A vehicle snow and ice remover comprising:
a plurality of first modular frames, the first modular frames having a first shape,
a plurality of second modular frames, the second modular frames having a second shape different than the first shape, the first modular frames and the second modular frames to be connected to form a first side frame and a second side frame opposite the first side frame, the first side frame includes at least two first modular frames and at least two second modular frames, the second side frame includes at least two first modular frames and at least two second modular frames; and
a cross frame connecting the first side frame and the second side frame, and wherein the cross frame includes at least two first modular frames.

13. The vehicle snow and ice remover of claim 12, wherein the second modular frames each includes at least two first modular frames coupled together to provide the second shape.

14. A vehicle snow and ice remover comprising:
a first side frame including a first set of modular frames, the first set of modular frames to form the first side frame of the vehicle snow and ice remover, wherein at least three modular frames of the first set of modular frames are to couple to define at least a portion of a first length of the first side frame;
a second side frame including a second set of the modular frames, the second set of the modular frames to form the second side frame of the vehicle snow and ice remover, wherein at least three modular frames of the second set of modular frames are to couple to define at least a portion of a second length of the second side frame; and
a cross frame interconnecting and spanning between the first side frame and the second side frame.

15. The vehicle snow and ice remover of claim 14, wherein the modular frames have a triangular shape, and wherein the modular frames can be configured to have a rectangular shape.

16. The vehicle snow and ice remover of claim 14, further including a plow retainer coupled to the first side frame and the second side frame, the plow retainer having a U-shaped frame.

17. The vehicle snow and ice remover of claim 16, further including a plow assembly coupled to the plow retainer.

18. The vehicle snow and ice remover of claim 14, further including a plurality of outriggers including a third set of the modular frames, a first outrigger to couple to the first side frame and a second outrigger to couple to the second side frame.

19. The vehicle snow and ice remover of claim 18, further including a plurality of ballasts, respective ones of the ballast coupled to respective ones of the outriggers.

20. The vehicle snow and ice remover of claim 14, wherein the at least three modular frames of the first set of modular frames are stacked vertically.

21. A method comprising:
forming a first side frame by coupling a first set of first modular frames and second modular frames, the first modular frames having a first shape and the second modular frames having a second shape different than the first shape, the second modular frames formed by a plurality of the first modular frames to provide the second shape; and
forming a second side frame by coupling a second set of the first modular frames and the second modular frames and forming a cross frame connecting the first side frame and the second side frame.

22. The method of claim 21, wherein forming the cross frame includes coupling a third set of first modular frames and the second side frame.

23. The method of claim 21, further including coupling a plow retainer to the first side frame and the second side frame and attaching a plow assembly to the plow retainer.

* * * * *